No. 798,644. PATENTED SEPT. 5, 1905.
F. L. O. WADSWORTH.
MANUFACTURE OF SHEETS OF GLASS.
APPLICATION FILED SEPT. 29, 1903.
3 SHEETS—SHEET 3.
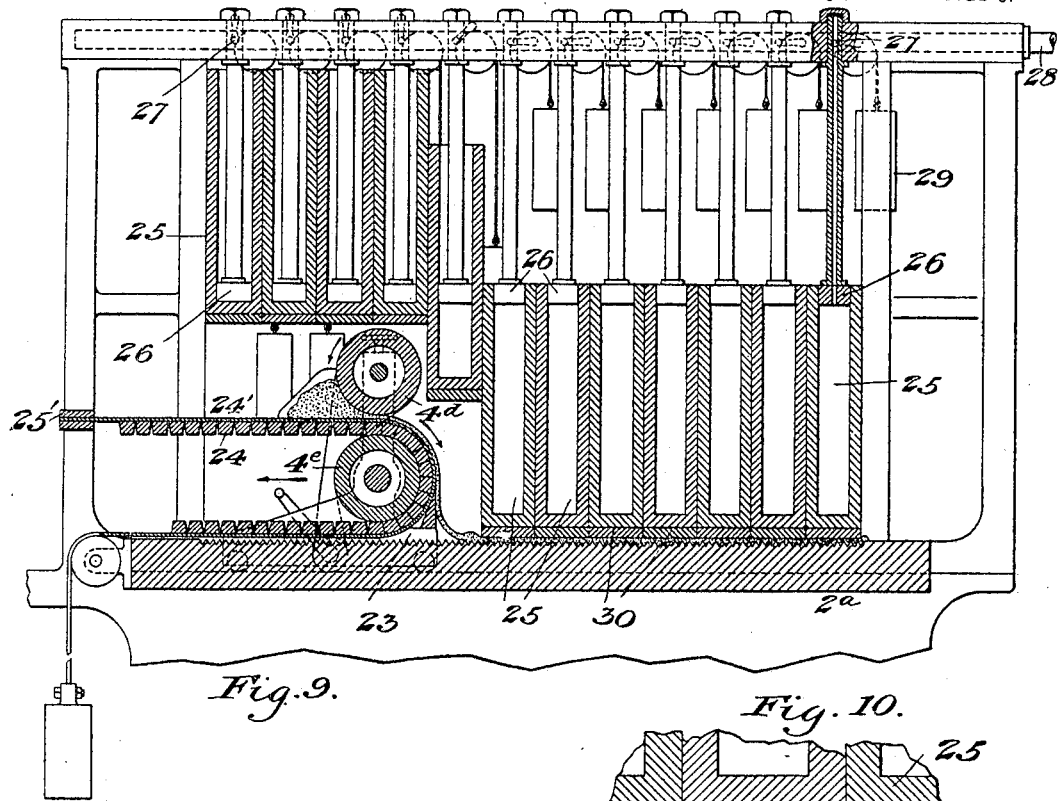
Fig. 9.
Fig. 10.
Fig. 11.
WITNESSES
INVENTOR
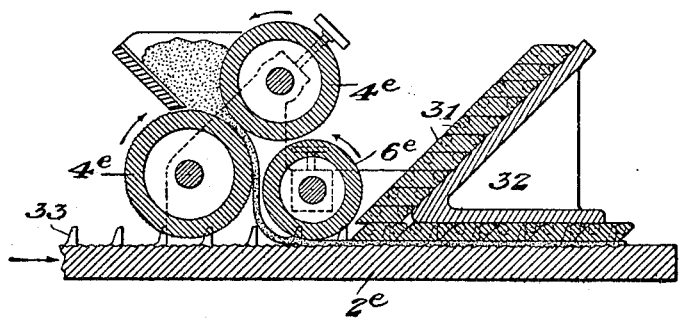

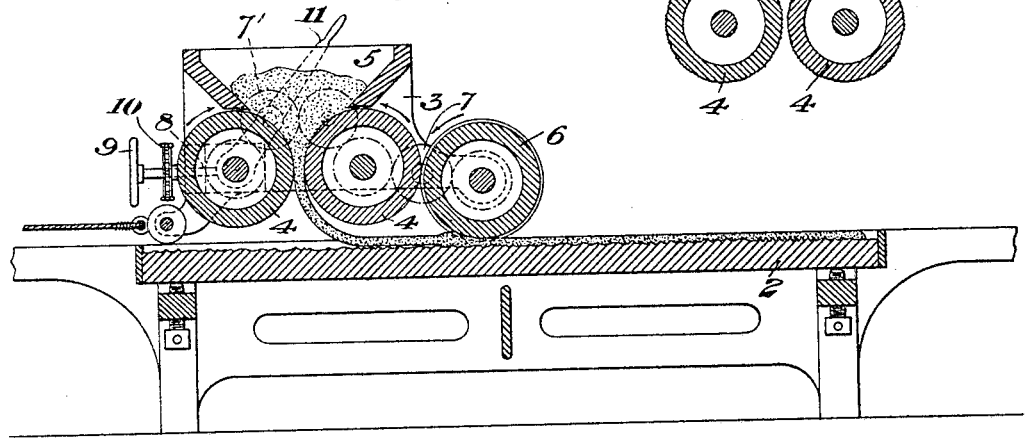
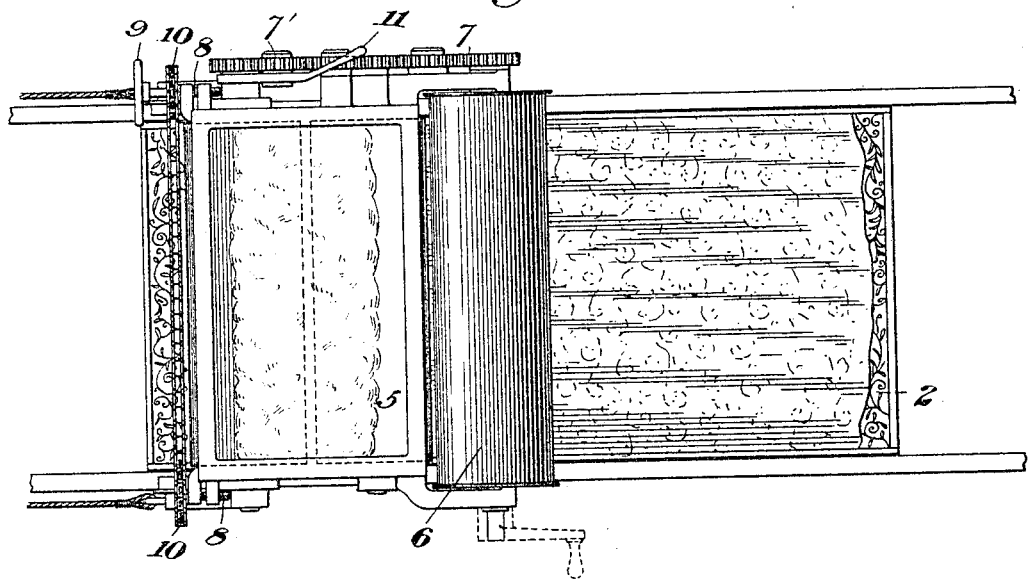

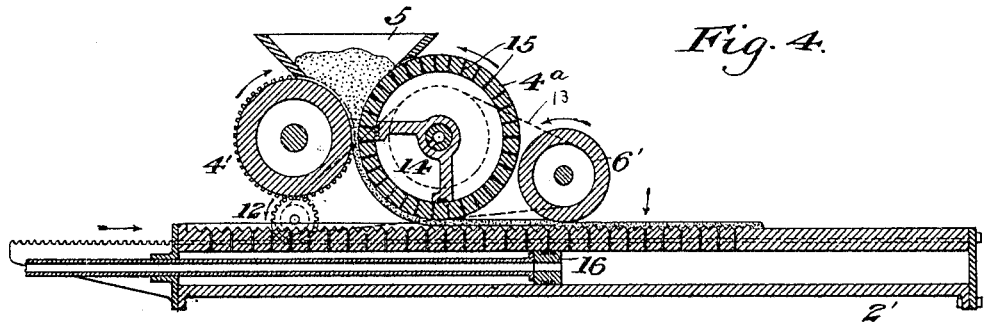
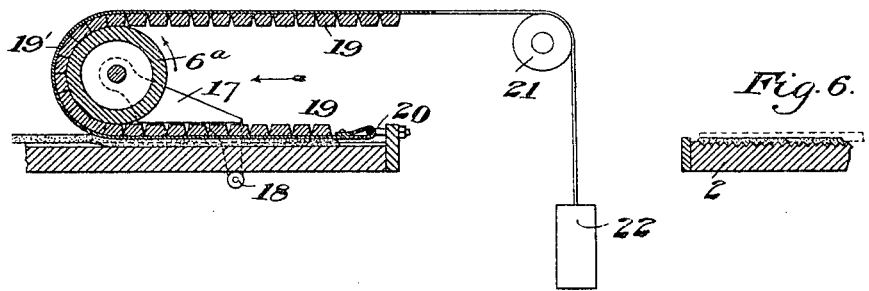
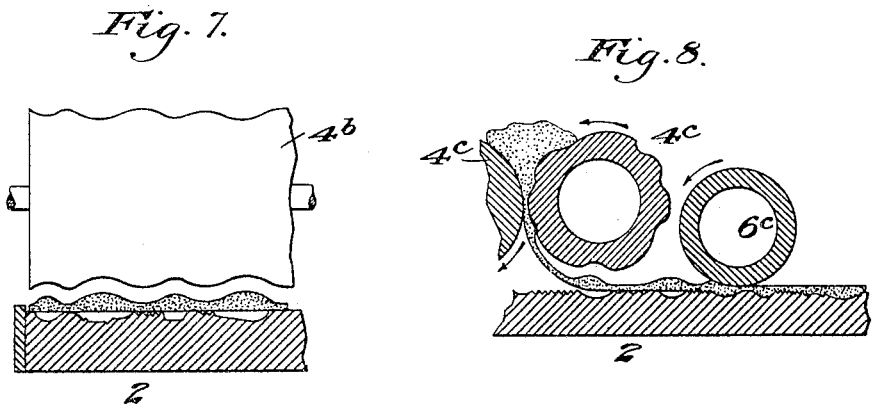

UNITED STATES PATENT OFFICE.

FRANK L. O. WADSWORTH, OF ALLEGHENY, PENNSYLVANIA.

MANUFACTURE OF SHEETS OF GLASS.

No. 798,644.   Specification of Letters Patent.   Patented Sept. 5, 1905.

Application filed September 29, 1903. Serial No. 175,028.

*To all whom it may concern:*

Be it known that I, FRANK L. O. WADSWORTH, of Allegheny, in the county of Allegheny and State of Pennsylvania, have invented a new and useful Improvement in the Manufacture of Sheets of Glass, of which the following is a full, clear, and exact description, reference being had to the accompanying drawings, forming part of this specification, in which—

Figure 1 is a longitudinal section of apparatus suitably constructed for the practice of my invention. Fig. 2 is a sectional view of forming-rolls having roughened surfaces which may be substituted for the smooth sheet-forming rolls of Fig. 1. Fig. 3 is a plan view of the apparatus shown in Fig. 1. Figs. 4 and 5 are longitudinal sections illustrating apparatus of modified construction. Fig. 2 is a partial cross-section of the table shown in Fig. 5. Fig. 7 shows in elevation a forming-roll shaped to produce a sheet of variable section across its width, with a table whose surface is shaped to modify further the section of the glass without spreading it laterally. The purpose of the pattern upon the roll is to deliver to the table a glass sheet in which the glass is distributed in volume conformable to the pattern intended to be produced upon it by the table. Fig. 8 is a longitudinal section of apparatus adapted to produce a sheet of variable section longitudinally. Fig. 9 is a longitudinal section of apparatus of modified construction in which the forcing of the sheet against the table is effected by a series of plungers. Fig. 10 is a sectional view illustrating a modification of the plunger shown in Fig. 9. Fig. 11 is a sectional view illustrating another modification of the apparatus.

In the manufacture of glass sheets it has been found to be difficult and expensive to shape the face of the sheet by patterning the surface of the forming-table on which the glass is rolled, and where the pattern desired is deep or has sharp points or edges it is in most cases impracticable to form it in this way, because the hot glass soon destroys the pattern on the table, and thus spoils the table for use. A further difficulty experienced in such cases is that the heat of the glass causes it to weld to the projecting points of the pattern, so that when it is attempted to remove the sheet the glass will be broken or the pattern marred. I have discovered that these difficulties may be overcome and figured tables used successfully in the manufacture of ornamental glass or prism-glass by providing means by which the glass is reduced to sheet form before it is delivered upon the figured tables and while it is still plastic and resting on the table forcing it against the same by rolling or by pressing, so as to produce the pattern upon its surface.

The invention may be carried out with apparatus of many forms, some of which I have illustrated in the drawings.

In Fig. 1, 2 is the table, and 3 is the carriage adapted to travel along the same. On this carriage are two sheet-forming rolls 4 4, to which the molten glass is delivered from a hopper 5, and following the rolls 4 is a third roll 6. As the carriage is drawn along the table the roll 6 is rotated by traction, and by means of intermediate gearing 7 rotation is communicated to the rolls 4 4, by which the molten glass is rolled into sheet form and the sheet deposited upon the surface of the table 2. As the sheet is deposited upon the table it is pressed closely against the patterned surface thereof by the following roller 6. The glass will have lost a considerable portion of its heat in the act of rolling it into a sheet on the rolls 4 4, so that when it comes in contact with the table and is forced against the same by the following roll 6 it will not be sufficiently hot to stick to the table or to injure the surface thereof. I am enabled in this way to impart intricate patterns to the glass or to make prism-glass with sharply-defined and deep angles. This result, so far as I am aware, has not been accomplished heretofore by methods of rolling on figured tables. The surfaces of the rolls 4 4 may be plain, as shown in Fig. 1, or may be roughened, as in Fig. 2. The thickness of the sheet which is produced by the rolls 4 4 may be varied and adjusted by adjusting-screws 8 8 which act upon the bearings of one of the rolls and may be operated together by a hand-wheel 9 and a connecting-sprocket 10. The thickness of the sheet delivered to the table may thus be varied, if desired, during the rolling of the sheet, and a sheet having portions of unequal thickness may thus be produced. Where this is done, it is necessary also to move the gearing of the rolls in order to prevent disengagement thereof, and for this purpose I journal one of the gears 7' on a hand-lever 11, so that the operator with one hand on the wheel 9 may vary the distance of separation of the rolls and with the other hand may move the lever 11 to keep the gears in contact.

In Fig. 4 I show a modified construction of the apparatus in which the rolls are stationary, and the table 2' is caused to move beneath them, one of the rolls 4' being connected by the gear-wheel 12 with a rack on the table so that the motion of the table will rotate the rolls. The other roll 4ª and the following roll 6' may be driven by a sprocket-chain 13 from a sprocket on the shaft of the gear-wheel 12. The roll 4ª is preferably hollow and revolves around a vacuum-chamber 14, constructed as described in my application Serial No. 160,876, the surface of the roll having perforations 15, so that as the glass sheet passes from the hopper along the roll opposite to the vacuum-chamber it is held against the roll by air-pressure, and thus delivered evenly and flatly upon the table. The table also may be hollow and provided with perforations extending through the surface-pattern and may be adapted to move over a stationary plunger 16, which is hollow and communicates with the vacuum apparatus. The plunger 16 is beneath the following roll 6', so that portions of the table beyond this roller are subjected to the action of the vacuum, and as the glass is forced by the roll against the table the vacuum will hold it in contact therewith and by keeping the patterned surface of the glass in contact with the table during the setting of the glass will insure perfect results and prevent the blurring of the pattens, which might result if the glass were separated from the table before it had completely set.

In the apparatus shown in Fig. 5 I show the following roll 6ª; but the forming-rolls are not shown. This following roll is mounted on a carriage 17, which is held positively against the table by a roller 18, bearing on the under side of the table. 19 19 are pressure-blocks connected in flexible series and faced with a steel sheet 19', attached at one end to the table at 20, thence passing under and around the roll 6ª and over a pulley 21 to a weight or other yielding device 22. As the carriage is advanced in the direction of the arrow the roll presses the blocks successively against the glass sheet and the pressure of the blocks in the rear of the roll is maintained upon the glass by portion of the carriage which projects over and in contact with the surface of the blocks.

The table shown in Fig. 5 is grooved longitudinally with prism-shaped grooves, which are further shown in cross-section in Fig. 6.

Where the pattern on the surface of the table is irregular in contour and is deeper in some parts than in others, it is desirable that the glass should be distributed so that it shall be greater in volume over the deeper portions. I can accomplish this, as shown in Fig. 7, by corrugating the surface of the forming roll or rolls 4ᵇ, so as to produce a sheet of varying cross-section, the thicker portions extending along the sheet directly over the deeper portion of the pattern on the table. When the sheet is then engaged by the following roll, the thicker portions of the glass will fill the deeper portions of the pattern, and a uniform and properly-distributed sheet will be produced.

The forming-roll shown in Fig. 7 is adapted for a table in which the varying section extends transversely. Where the varying section of the table is longitudinal, as in Fig. 8, one of the forming-rolls 4ᶜ is provided with corrugations extending along the length of the roll. Fig. 8 also illustrates the manner in which the following roll 6ᶜ flattens the sheet and forces the corrugations thereof into the deeper portions of the pattern of the table.

In the apparatus shown in Fig. 9 the forming-rolls 4ᵈ 4ᵉ are mounted upon a traveling carriage 23 and have between them a belt 24, formed by flexibly-connected blocks, one end of the series being fixed to the machine at 25' and the other end being connected to a weight or other yielding device for taking up the slack. The blocks of the belt are faced with a steel sheet 24', as in the apparatus shown in Fig. 5, so as to present a flat surface to the glass. The carriage is adapted to move in the direction of the arrow from one end of the table 2ª to the other, and as it travels a mass of plastic glass is rolled into sheet form between the roll 4ᵈ and the surface of the belt and is delivered by the belt upon the patterned surface of the table. As the glass sheet is delivered upon the table it is engaged and pressed against the same by successively-acting plungers, which may be actuated by air or other fluid pressure. Each plunger 25 is made hollow and is fitted in the manner of a cylinder upon a hollow piston 26, having at its upper end a valve connection 27 with a fluid-supply pipe 28. As the carriage advances the operator opens successively the valves of the ports 27, and the plungers 25 are thereupon forced down into contact with the surface of the glass, pressing it firmly against the patterned table. When the sheet has been formed, the plungers 25 may be raised by cutting off the connection of the pipe 28 with the piston 26 and putting the latter into communication with the exhaust, whereupon weights 29 will automatically raise the plungers above the glass and leave the latter free to be removed. The ends of the plungers 25 are preferably provided with detachable faces 30, so that they may be renewed when desired, and these faces may either be plain, as shown in Fig. 9, or may be provided with a pattern, as shown on two of the plungers in Fig. 10.

In Fig. 11 I show a further modification, in which $4^e$ represents the sheet-forming rolls, mounted upon a stationary frame, and $2^e$ is the patterned table adapted to move thereunder in the direction of the arrow. $6^e$ is the following roll, by which the glass sheet delivered from the forming-rolls is pressed against the surface of the table. For the purpose of holding the sheet upon the table until it has become perfectly set I prefer to employ a series of retaining-blocks 31, which may be stacked one upon another in an inclined pile on a frame 32, the under surface of which is elevated somewhat above the table and serves as a pressure-foot. As the table advances, carrying the sheet which has been delivered thereon and has been acted upon by the following roller, the blocks 31 are engaged successively by projections 33 on the table and are carried under the pressure-foot, each block as it passes making room for the block next above, which then drops upon the surface of the glass. As the blocks pass successively beyond the pressure-foot they may be lifted from the glass and placed again on top of the pile.

I claim—

1. The method herein described of making figured glass sheets which consists in forming a rough glass sheet out of contact with the table on which it is finally shaped, delivering it as it is formed upon a table having a figured surface, and forcing it against said figured surface; substantially as described.

2. The method herein described of making figured glass sheets of considerably-different thicknesses at different parts, which consists in forming a sheet of glass having inequalities of thickness conforming in position and approximate section, to the appropriate portions of the pattern to be produced, and then forcing such pattern upon the glass with the deeper portions of the pattern in register with the thicker portions of the sheet; substantially as described.

3. The method herein described of making figured glass sheets of considerably-different thicknesses at different parts, which consists in first forming a sheet of variable cross-sectional area corresponding to the variable thicknesses, and then by pressure refiguring the surface of the sheet without further spreading of the material laterally; substantially as described.

In testimony whereof I have hereunto set my hand.

FRANK L. O. WADSWORTH.

Witnesses:
JOHN MILLER,
H. M. CORWIN.